US011904981B2

(12) United States Patent
Tsai

(10) Patent No.: US 11,904,981 B2
(45) Date of Patent: Feb. 20, 2024

(54) BICYCLE GEAR HUB

(71) Applicant: Sun Race Sturmey-Archer Inc., Taoyuan (TW)

(72) Inventor: Ming-Chih Tsai, Taoyuan (TW)

(73) Assignee: SUN RACE STURMEY-ARCHER INC., Taoyuan (TW)

( * ) Notice: Subject to any disclaimer, the term of this patent is extended or adjusted under 35 U.S.C. 154(b) by 0 days.

(21) Appl. No.: 18/138,831

(22) Filed: Apr. 25, 2023

(65) Prior Publication Data

US 2023/0339573 A1    Oct. 26, 2023

(30) Foreign Application Priority Data

Apr. 25, 2022  (TW) .................................. 111115715

(51) Int. Cl.
| | | |
|---|---|---|
| *B62M 11/18* | (2006.01) | |
| *B62M 11/16* | (2006.01) | |
| *B62M 25/08* | (2006.01) | |
| B62M 25/02 | (2006.01) | |
| F16H 3/46 | (2006.01) | |
| F16H 3/44 | (2006.01) | |

(52) U.S. Cl.
CPC ............. *B62M 11/16* (2013.01); *B62M 11/18* (2013.01); *B62M 25/08* (2013.01); B62M 25/02 (2013.01); F16H 3/46 (2013.01); F16H 2003/442 (2013.01); F16H 2200/0043 (2013.01); F16H 2200/2007 (2013.01); F16H 2200/2089 (2013.01)

(58) Field of Classification Search
CPC ................. F16H 2003/442; F16H 3/46; F16H 2200/0043; F16H 2200/2007; F16H 2200/2089; B62M 11/16; B62M 11/18; B62M 25/08; B62M 25/02
USPC ................................ 475/288, 289, 312, 314
See application file for complete search history.

(56) References Cited

U.S. PATENT DOCUMENTS

| | | | | |
|---|---|---|---|---|
| 5,855,530 | A * | 1/1999 | Huang ................... | B62M 11/18 475/341 |
| 6,533,700 | B2 * | 3/2003 | Shoge ................... | B62M 11/16 475/275 |
| 2013/0190128 | A1 * | 7/2013 | Gobel .................... | B62M 11/16 475/292 |
| 2016/0075403 | A1 * | 3/2016 | Yoo ........................ | B62M 11/16 475/269 |

* cited by examiner

*Primary Examiner* — Roger L Pang
(74) *Attorney, Agent, or Firm* — Locke Lord LLP; Tim Tingkang Xia, Esq.

(57) ABSTRACT

A bicycle gear hub includes an axle, planetary gear modules, one-way clutches and a shift mechanism. The planetary gear modules are connected in series at the axle. The shift mechanism includes a shift actuator and control pawls movably disposed at different positions of the axle. The shift actuator includes recess portions to control opening and closing of a control protrusion of one control pawl, and further to control a sun gear of the corresponding planetary gear module to the axle. When a high gear is shifted to a low gear, a rotational direction of the shift actuator is identical to a rotational direction for closing the control pawl.

11 Claims, 13 Drawing Sheets

BICYCLE GEAR HUB

CROSS REFERENCE TO RELATED APPLICATION

This application claims the benefits of Taiwan application Serial No. 111115715, filed on Apr. 25, 2022, the disclosures of which are incorporated by references herein in its entirety.

TECHNICAL FIELD

The present disclosure relates in general to a bicycle gear hub.

BACKGROUND

In the art, the planetary gear system is generally utilized to design the bicycle gear hub with versatile speed ratios. For example, in European patent publication EP1289827B2, three different planetary gear modules are connected in series, and each of the planetary gear modules is furnished with an open ratio and a close speed ratio, such that a total of 8 speed ratios can be achieved. In this effort, each of the planetary gear modules utilizes a control pawl to fix a sun gear to an axle so as to provide a speed-up ratio greater than 1 for obtaining an effect of speed increase. Contrarily, with the control pawl to close, the sun gear would disengage the axle, so that the sun gear can rotate freely to provide a 1:1 speed ratio.

In another example having two planetary gear modules to provide four gears; a first gear, a second gear, a third gear and a fourth gear. The first gear is provided to obtain a speed ratio of 1:1 with two axial pawls closed. At the second gear or the third gear, the axial pawls shall be one opened and another closed. Though each of the second gear and the third gear can provide a speed ratio greater than 1, yet operations of the related mechanisms are quite complicated, upon the determination which axial pawl shall be opened or closed, or that to simultaneously open one axial pawl and close another one. In particular, in the situation that an opened axial pawl is to be closed, the related control wouldn't be easy, but venerable to damage the mechanism. Regarding the fourth gear, the two axial pawls are both opened to provide the highest speed ratio. Further, importantly, while the gear is shifted from the third gear to the second gear, a close direction of a control protrusion of the control pawl would be different to a rotational direction of a shift actuator. Namely, the control pawl shall be closed in a reverse manner.

Thus, the issue how to provide a bicycle gear hub that can improve the aforesaid shortcomings is definitely urgent to the skill in the art.

SUMMARY

An object of the present disclosure is to provide a bicycle gear hub that can provide a labor-saving effect while a high gear is switched to a low gear.

In one embodiment of this disclosure, a bicycle gear hub includes an axle, a plurality of planetary gear modules, a plurality of one-way clutches and a shift mechanism. The plurality of planetary gear modules are sequentially disposed at the axle. The plurality of planetary gear modules are connected in series. The planetary gear module includes a planet carrier, a ring gear and a sun gear. The planet carrier is furnished thereinside with the sun gear. The ring gear is meshed with the planet gear in the planet carrier. The plurality of one-way clutches are connected with the corresponding planet carrier and ring gear. The shift mechanism includes a shift actuator and at least two control pawls. The shift actuator is disposed at the axle. The control pawls are movably disposed at different positions of the axle. The control pawl includes a control protrusion. The shift actuator includes thereinside a plurality of recess portions corresponding to the control protrusions. As the shift actuator is rotated, according to a plurality of speed-up ratios provided by the plurality of planetary gear modules, gearshift between a low gear and a high gear is performed. While in each the gearshift, the plurality of recess portions are used to control opening and closing of the control protrusion of one of the plurality of control pawls, and further to control the sun gear corresponding to the planetary gear module to be fixed to the axle. While in shifting from a high gear to a low gear, a rotational direction of the shift actuator is identical to another rotational direction for closing the control pawl.

As stated, when the high gear is shifted to the low gear in this disclosure, the fastest planetary gear module is firstly closed, such that the resistance against gearshift can be reduced, and also the labor can be saved.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
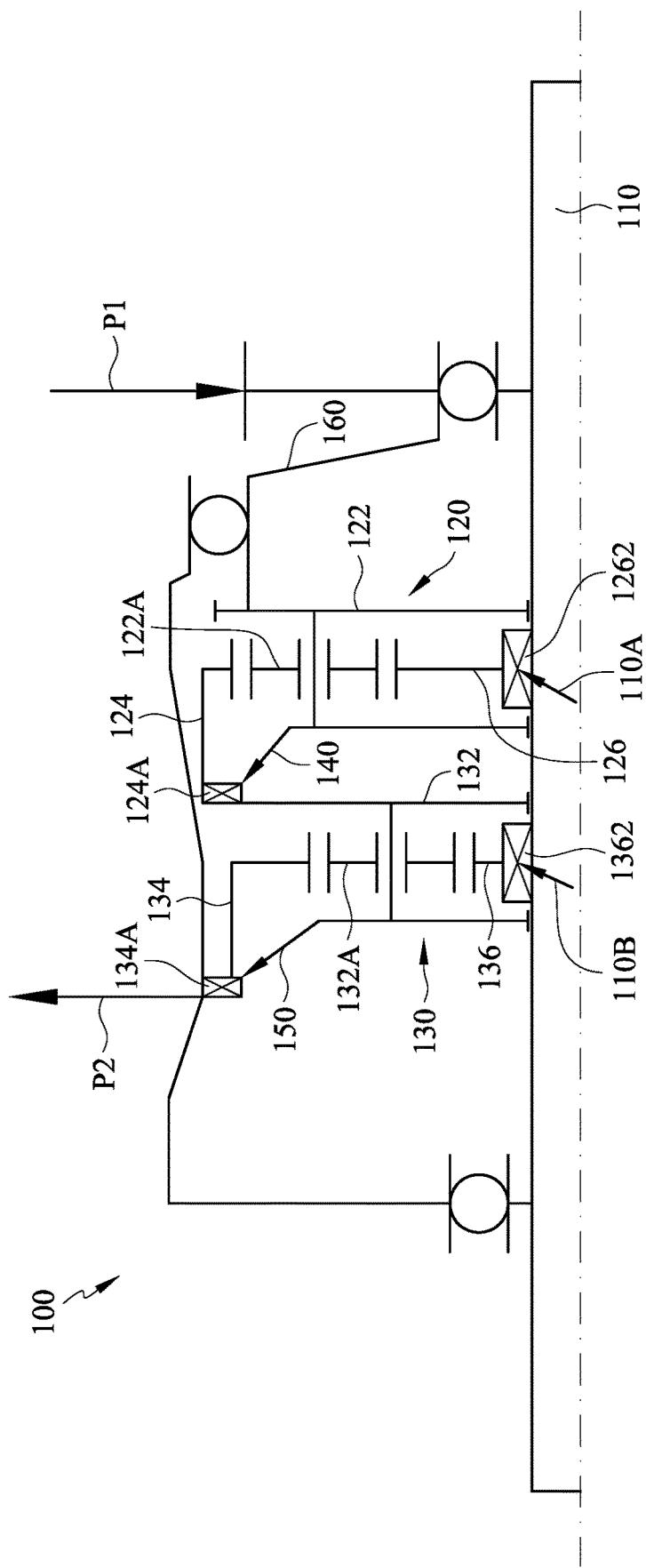
FIG. 1 is a schematic view of planetary gear modules of a bicycle gear hub to be connected in series in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be noted that, in the descriptions of different embodiments, the so-called "first", "second" and "third" are used to describe different components, and most components are not limited by such predicates. In addition, for the convenience and clarity of description, the thickness or size of each component in the drawings is expressed in an exaggerated, omitted or approximate manner for the understanding and reading of those familiar with the art, and the size of each component is not the actual size and is not used to limit the conditions for the implementation of this disclosure, so it has no technical significance. Any modification of the structure, change of the proportional relationship or adjustment of the size will not affect the performance of the disclosure. The effects and the goals that can be achieved should still fall within the scope covered by the technical content disclosed in this disclosure.

FIG. 1 is a schematic view of planetary gear modules of a bicycle gear hub to be connected in series in accordance with this disclosure. As shown, the bicycle gear hub 100 includes an axle 110, at least two planetary gear modules (a first planetary gear module 120 and a second planetary gear module 130 as shown) and at least two one-way clutches (a first one-way clutch 140 and a second one-way clutch 150 as shown), in which the number of the one-way clutches is equal to that of the planetary gear modules. In addition, these two planetary gear modules 120, 130 are orderly disposed along the axle 110.

It shall be explained that, for elucidating this disclosure conveniently, two planetary gear modules are raised as a typical example for following description, but not limited thereto. As shown, the first planetary gear module 120 includes a first planet carrier 122, a first ring gear 124 and a first sun gear 126. The first planet carrier 122 is further provided in a pivotal manner with at least a first planet gear 122A. The first sun gear 126 is located within the first planet carrier 122 to mesh the first planet gear 122A. The first ring gear 124 is to mesh the first planet gear 122A as well. The first one-way clutch 140 is connected with the first planet carrier 122 and the first ring gear 124. In this disclosure, the type of the first one-way clutch 140 is not limited thereto. For example, the first one-way clutch 140 can be a pawl of the first planet carrier 122 for engaging another sprocket tooth 124A of the first ring gear 124.

The second planetary gear module 130 is structurally similar to the first planetary gear module 120. The second planetary gear module 130 includes a second planet carrier 132, a second ring gear 134 and a second sun gear 136. The second planet carrier 132 is pivotally connected with the first ring gear 124. The second planet carrier 132 is provided with at least a second planet gear 132A. The second sun gear 136 is located within the second planet carrier 132. The second ring gear 134 is meshed with the second planet gear 132A. The second one-way clutch 150 is connected with both the second planet carrier 132 and the second ring gear 134. However, this disclosure is not to limit the type of the second one-way clutch 150. For example, the second one-way clutch 150 can be a pawl of the second planet carrier 132 for engaging a sprocket tooth 134A of the second ring gear 134.

The first planetary gear module 120 and the second planetary gear module 130 are sequentially disposed along the axle 110. A first sprocket tooth 1262 inside the first sun gear 126 is corresponding to a first pawl 110A at the axle 110, and a second sprocket tooth 1362 inside the second sun gear 136 is corresponding to a second pawl 110B at the axle 110. In addition, the first ring gear 124 of the first planetary gear module 120 is exactly a portion of the second planet carrier 132 of the second planetary gear module 130, such that the first planetary gear module 120 and the second planetary gear module 130 can be connected in series. Similarly, the second ring gear 134 of the second planetary gear module 130 can be utilized to further connect a third planetary gear module in series, and so forth. Depending upon practical requirements, the exact number of the planetary gear modules connected in series can be determined.

In this embodiment, control of gearshift can be achieved through fixing the sun gears such as the first sun gear 126 and the second sun gear 136, to the axle 110. The power can be inputted through the planet carrier. For example, as the transmission part 160 connects the first planetary gear module 120, the power can be inputted from the input end P1, and transmitted to the first planet carrier 122 of the first planetary gear module 120 via the transmission part 160. At this time, if the first sun gear 126 is fixed to the axle 110, the first planetary gear module 120 would contribute a speed-up ratio to be outputted through the first ring gear 124. This is called as a 1:speed-up input/output mode, in which the speed-up ratio is determined by the corresponding gear ratio. Obviously, at this time, the rotation speed of the first ring gear 124 is faster than that of the first planet carrier 122, such that the one-way clutch 140 at the first planet carrier 122 would be ineffective.

On the other hand, if the first sun gear 126 is not fixed to the axle 110, then the first planetary gear module 120 would fail to contribute the speed-up ratio, and the power would output through the one-way clutch 140 at the first planet carrier 122. Such an operation is called as a 1:1 input/output mode. Namely, the first planetary gear module 120 can contribute two speed ratios; I.e., 1:1 and 1:speed-up. Similarly, the second planetary gear module 130 can contribute a 1:1 ratio and a 1:speed-up ratio to be outputted through the output end P2.

If both the first sun gear 126 and the second sun gear 136 are not fixed to the axle 110, then the speed ratios contributed by the first planetary gear module 120 and the second planetary gear module 130 are both the 1:1 input/output modes; i.e., a low gear of the first gear. If the first sun gear 126 is fixed to the axle 110 while the second sun gear 136 is not fixed to the axle 110, then the first planetary gear module 120 would present the speed-up input/output mode, but the second planetary gear module 130 wouldn't be in the speed-up input/output mode; i.e., the second gear. Then, if the first sun gear 126 is not fixed to the axle 110, but the second sun gear 136 is fixed to the axle 110, thus the second planetary gear module 130 would present the speed-up input/output mode, but the first planetary gear module 120 wouldn't be in the speed-up input/output mode; i.e., the third gear. Finally, if both the first sun gear 126 and the second sun gear 136 are both fixed to the axle 110, thus the speed-up ratio of the first planetary gear module 120 and the speed-up ratio of the second planetary gear module 130 would be added together to achieve a high gear of the fourth gear.

TABLE 1

|  | Sun gear | Planet gear | Ring gear | Speed ratio |
|---|---|---|---|---|
| First planetary gear module 120 | 42T | 13T | 68T | 1.63 |
| Second planetary gear module 130 | 19T | 24T | 68T | 1.28 |

Table 1 demonstrates an exemplary example of the two planetary gear modules, where T stands for the number of teeth.

TABLE 2

|  | First sun gear 126 | Second sun gear 136 | Speed ratio |
|---|---|---|---|
| First gear | Closed | Closed | 1 |
| Second gear | Closed | Opened | 1.28 |
| Third gear | Opened | Closed | 1.63 |
| Fourth gear | Opened | Opened | 2.09 |

Table 2 demonstrates four speed ratios contributed by the two planetary gear modules, where "Closed" implies that the control pawl is closed to have the sun gear (such as the first sun gear 126 or the second sun gear 136) not to be fixed to the axle 110, and "Opened" implies that the control pawl is opened to have the sun gear (such as the first sun gear 126 or the second sun gear 136) to be fixed to the axle 110.

TABLE 3

|  | First sun gear 126 | Second sun gear 136 | Speed ratio |
|---|---|---|---|
| First gear | Closed | Closed | 1 |
| Second gear | Opened | Closed | 1.63 |
| Third gear | Opened | Opened | 2.09 |

Table 3 demonstrates three speed ratios contributed by the two planetary gear modules of Table 1.

TABLE 4

|  | Sun gear | Planet gear | Ring gear | Speed ratio |
|---|---|---|---|---|
| First planetary gear module 120 | 29T | 14T | 58T | 1.5 |
| Second planetary gear module 130 | 18T | 18T | 54T | 1.33 |

Table 4 demonstrates another exemplary example of the two planetary gear modules, where T stands for the number of teeth. From Table 1 and Table 4, it can be understood that the speed-up ratio can be over the N-th power of 1.33, in which N is the number of the planetary gear modules.

TABLE 5

|  | First sun gear 126 | Second sun gear 136 | Speed ratio |
|---|---|---|---|
| First gear | Closed | Closed | 1 |
| Second gear | Opened | Closed | 1.5 |
| Third gear | Opened | Opened | 2.0 |

Table 5 demonstrates three speed ratios contributed by the two planetary gear modules of Table 4.

As described above, two planetary gear modules (each of which contributes two speed ratios) together can contribute four different speed ratios at most. However, this disclosure does not utilize these two planetary gear modules to form four gears, but to form three gears (see Table 3). From Table 3 and Table 2, it can be found that the highest speed ratios thereof are identical. Namely, the highest speed ratio can be achieved simply by three gears. Generally, three of the aforesaid planetary gear modules can achieve 8 gears. However, according to this disclosure, the three of the aforesaid planetary gear modules are composed to provide four gears. In the following description, elements, methods, operations and performance of the shift mechanism would be elucidated.

Figure 2:
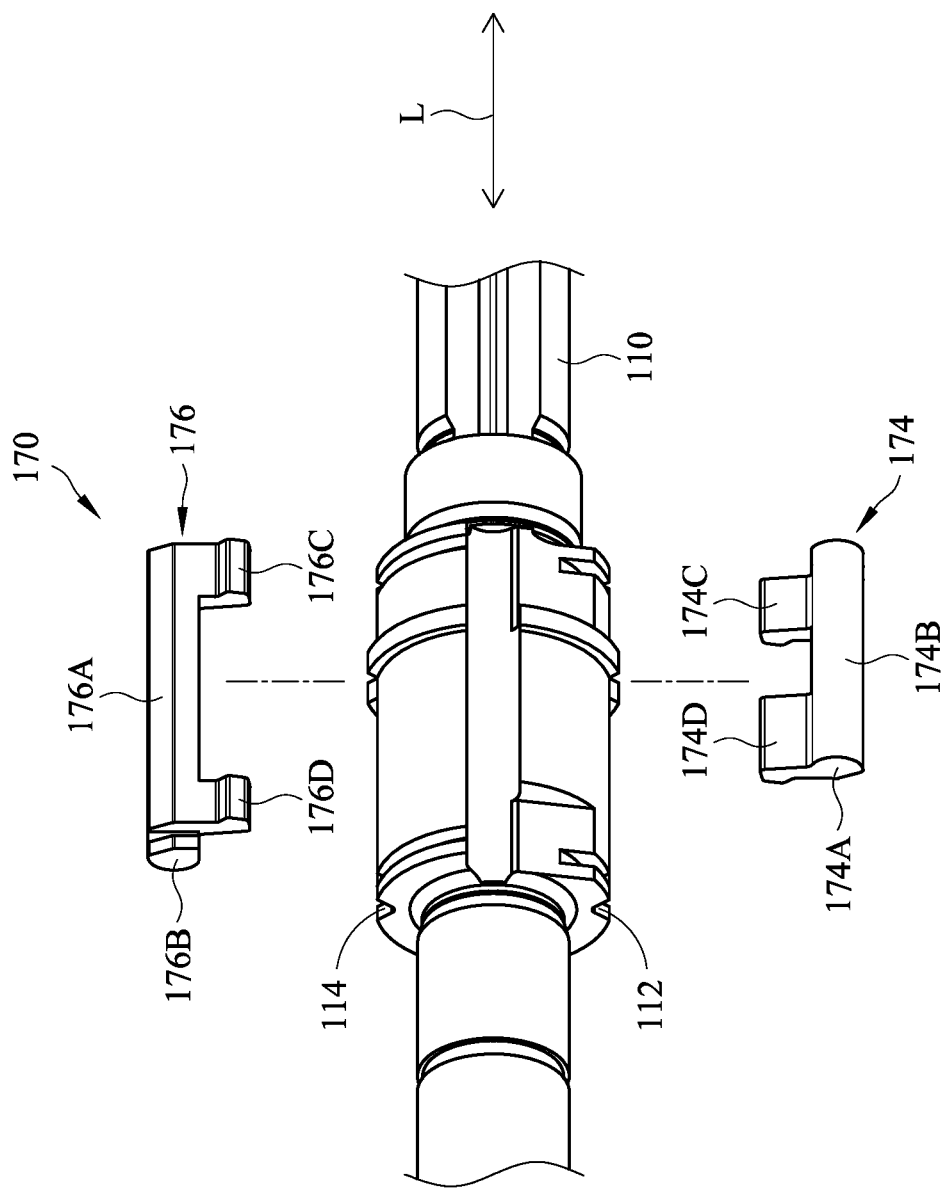
FIG. 2 is a schematic exploded view of the two control pawls and the axle in accordance with this disclosure.
Figure 3:
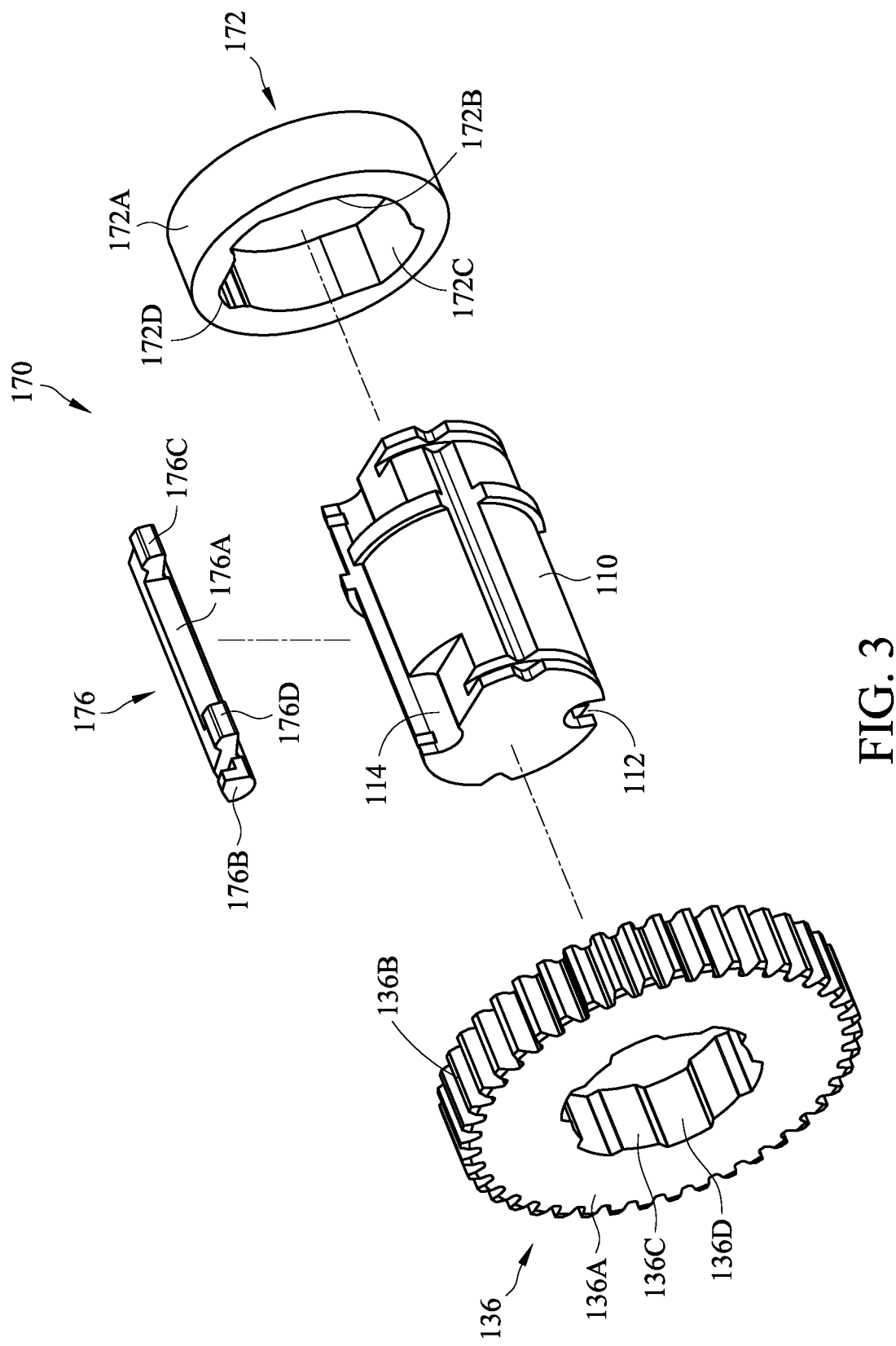
FIG. 3 is a schematic exploded view of the shift mechanism, the axle and the sun gear in accordance with this disclosure.
Figure 5:
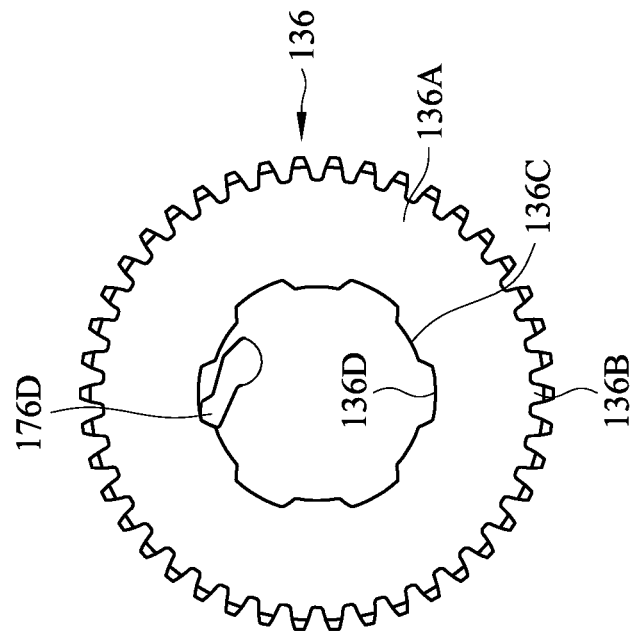
FIG. 5 is a schematic view of the sun gear of FIG. 4 and one control pawl in accordance with this disclosure.
Figure 4:
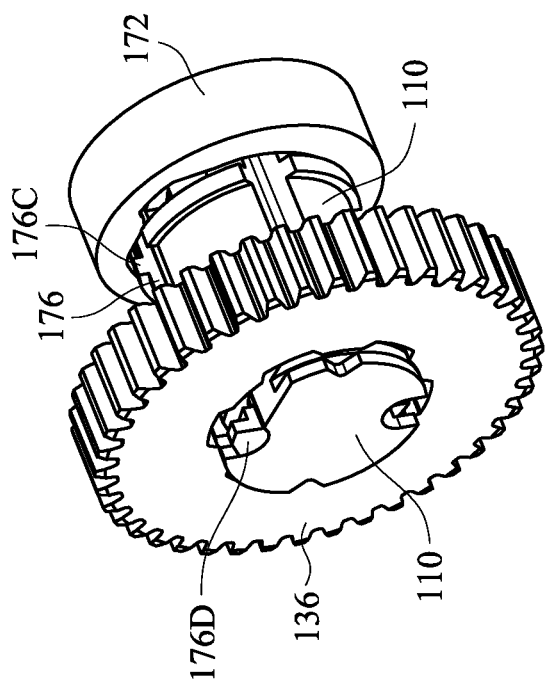
FIG. 4 is a schematic perspective view of FIG. 3.

FIG. 2 is a schematic exploded view of the two control pawls and the axle in accordance with this disclosure. FIG. 3 is a schematic exploded view of the shift mechanism, the axle and the sun gear in accordance with this disclosure. FIG. 4 is a schematic perspective view of FIG. 3. FIG. 5 is a schematic view of the sun gear of FIG. 4 and one control pawl in accordance with this disclosure. For convenience of description, only one control pawl is taken as an example for the axle of FIG. 3 to FIG. 5. Practically, the axle might have at least two control pawls. Anyway, the number of the control pawls shall be determined by the number of the planetary gear modules. Now, refer to FIG. 2 to FIG. 5.

In this embodiment, the shift mechanism 170, disposed at the axle 110, includes a shift actuator 172 (as shown in FIG. 3 and FIG. 4) and at least two control pawls (a first control pawl 174 and a second control pawl 176 in this embodiment). The number and positions of the control pawls are corresponding to those of the sun gears of the planetary gear modules. The first control pawl 174 and the second control pawl 176 are individually movably disposed at different positions of the axle 110, but along the same axle 110 in an axial direction L. A length of the first control pawl 174 is different to that of the second control pawl 176, in which the first control pawl 174 is corresponding to the first sun gear 126, and the second control pawl 176 is corresponding to the second sun gear 136. Hence, the number and positions of the control pawls are determined by those of the sun gears of the planetary gear modules.

As shown in FIG. 2, the first control pawl 174 is disposed in a first recess portion 112 of the axle 110, and the second control pawl 176 is disposed in a second recess portion 114 of the axle 110, in which the first recess portion 112 and the second recess portion 114 are disposed at different positions on an outer surface of the axle 110 in a concave manner.

For example, the first control pawl 174 includes a first pawl body 174A, a first fixing part 174B, a first control protrusion 174C and a first sun-gear engaging protrusion 174D, in which the first pawl body 174A has one end axially connected with the first fixing part 174B, and opposite ends of the first pawl body 174A are connected with the first control protrusion 174C and the first sun-gear engaging protrusion 174D, respectively, preferably in a perpendicular manner. The first control protrusion 174C and the first sun-gear engaging protrusion 174D are located within a length range of the first control pawl 174, and the first fixing part 174B is disposed into the first recess portion 112 of the axle 110.

For example, the second control pawl 176 includes a second pawl body 176A, a second fixing part 176B, a second control protrusion 176C and a second sun-gear engaging protrusion 176D, in which the second pawl body 176A has one end axially connected with the second fixing part 176B, and opposite ends of the second pawl body 176A are connected with the second control protrusion 176C and the second sun-gear engaging protrusion 176D, respectively, preferably in a perpendicular manner. The second control protrusion 176C and the second sun-gear engaging protrusion 176D are located within a length range of the second control pawl 176, and the second fixing part 176B is disposed into the second recess portion 114 of the axle 110.

As shown in FIG. 3, the shift actuator 172 and the second sun gear 136 are disposed individually at the axle 110, by corresponding in position to the second control protrusion 176C and the second sun-gear engaging protrusion 176D of the second control pawl 176, respectively.

For example, the shift actuator 172 includes a hollow ring body 172A, an inner surface 172B and a plurality of recess portions (a first recess portion 172C and a second recess portion 172D in this embodiment), in which the number and shapes of the recess portions are determined according to practical requirements. The first recess portion 172C and the second recess portion 172D are disposed in a concave manner at different positions of the inner surface 172B of the hollow ring body 172A. The second control protrusion 176C of the second control pawl 176 and the first control protrusion 174C of the first control pawl 174 are disposed inside the hollow ring body 172A. The plurality of recess portions, such as the first recess portion 172C and the second recess portion 172D, are used to control opening and closing of the control protrusions 174C, 176C of the respective first control pawl 174 and second control pawl 176. In this embodiment, an opened state of the control protrusion of the corresponding control pawl implies that this control protrusion (the first control protrusion 174C or the second control protrusion 176C) is positioned in the corresponding recess portion (the first recess portion 172C or the second recess portion 172D), and a closed state of the control protrusion of the corresponding control pawl implies that this control protrusion (the first control protrusion 174C or the second control protrusion 176C) is positioned out of the corresponding recess portion (the first recess portion 172C or the second recess portion 172D).

For example, the second sun gear 136 includes a sun-gear body 136A, a tooth portion 136B, an inner surface 136C and a plurality of recess portions 136D, in which the number and shapes of the recess portions are determined according to practical requirements. The recess portions 136D are individually disposed at different positions of the inner surface 136C of the body 136A in a concave manner. The second sun-gear engaging protrusion 176D of the second control pawl 176 and the first sun-gear engaging protrusion 174D of the first control pawl 174 are both positioned inside the sun-gear body 136A. An opened state of the control protrusion of the corresponding control pawl implies that this control protrusion, such as the first control protrusion 174C or the second control protrusion 176C), is positioned in the corresponding recess portion (the first recess portion 172C or the second recess portion 172D). In this opened state, respectively, the second sun-gear engaging protrusion 176D of the second control pawl 176 or the first sun-gear engaging protrusion 174D of the first control pawl 174 would be simultaneously moved into the corresponding recess portion 136D, so that the first sun gear 126 or the second sun gear 136 would be fixed to the axle 110. If the aforesaid control protrusion of the control pawl is closed, it implies that this control protrusion (the first control protrusion 174C or the second control protrusion 176C) is not in the corresponding recess portion (the first recess portion 172C or the second recess portion 172D). Also, simultaneously, the second sun-gear engaging protrusion 176D of the second control pawl 176 or the first sun-gear engaging protrusion 174D of the first control pawl 174 is not located in the recess portion 136D, such that the first sun gear 126 or the second sun gear 136 wouldn't be fixed to the axle 110. Thus, in this disclosure, the plurality of recess portions (the first recess portion 172C and the second recess portion 172D) are utilized to control opening and closing of the control protrusion of one of the control pawls, and further to control the sun gear (the first sun gear 126 or the second sun gear 136), corresponding to this planetary gear module (the first planetary gear module 120 or the second planetary gear module 130), to be fixed to the axle 110.

Figure 6:
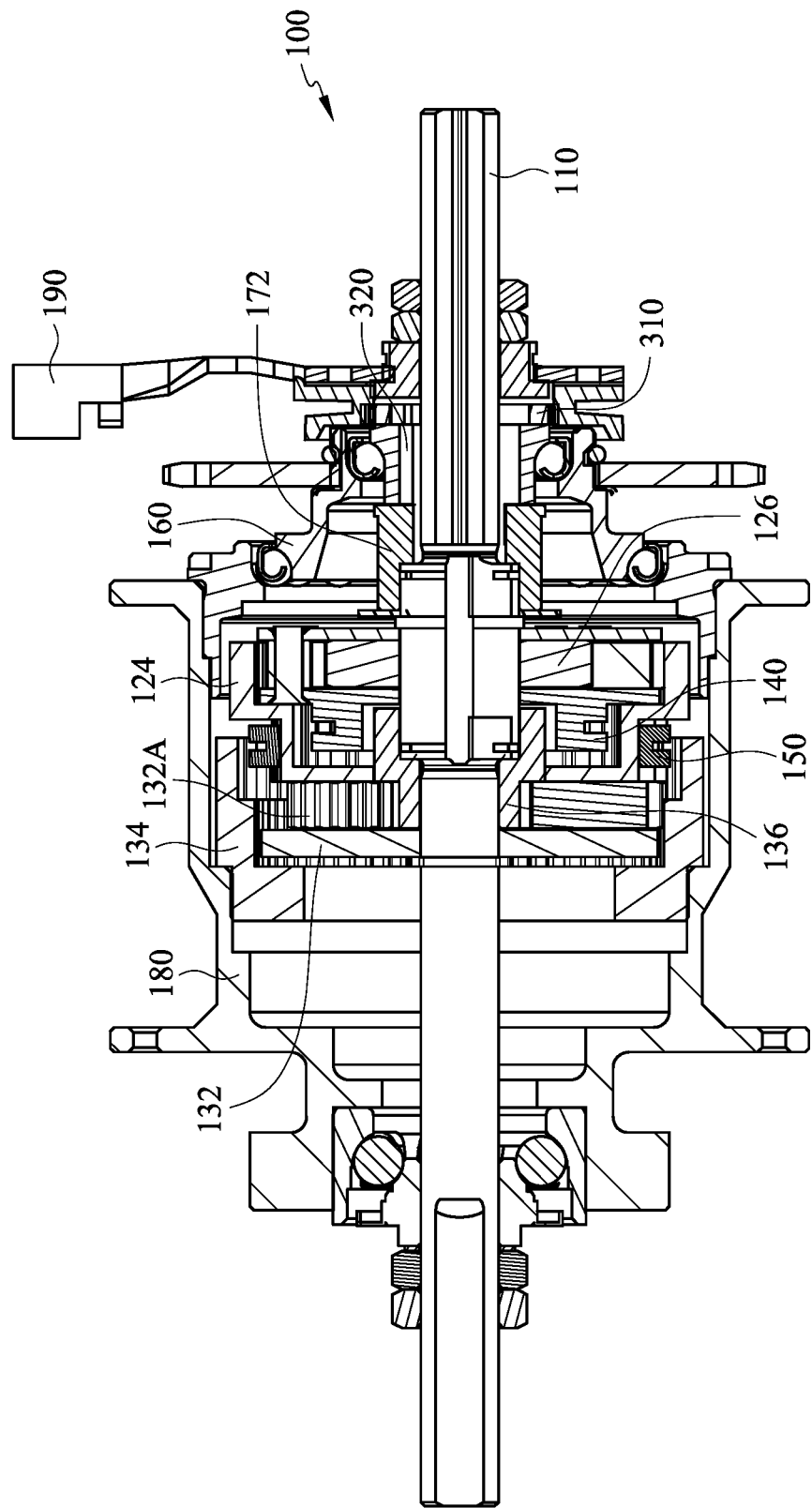
FIG. 6 is a schematic view of an embodiment of the bicycle gear hub in accordance with this disclosure.
Figure 7A:
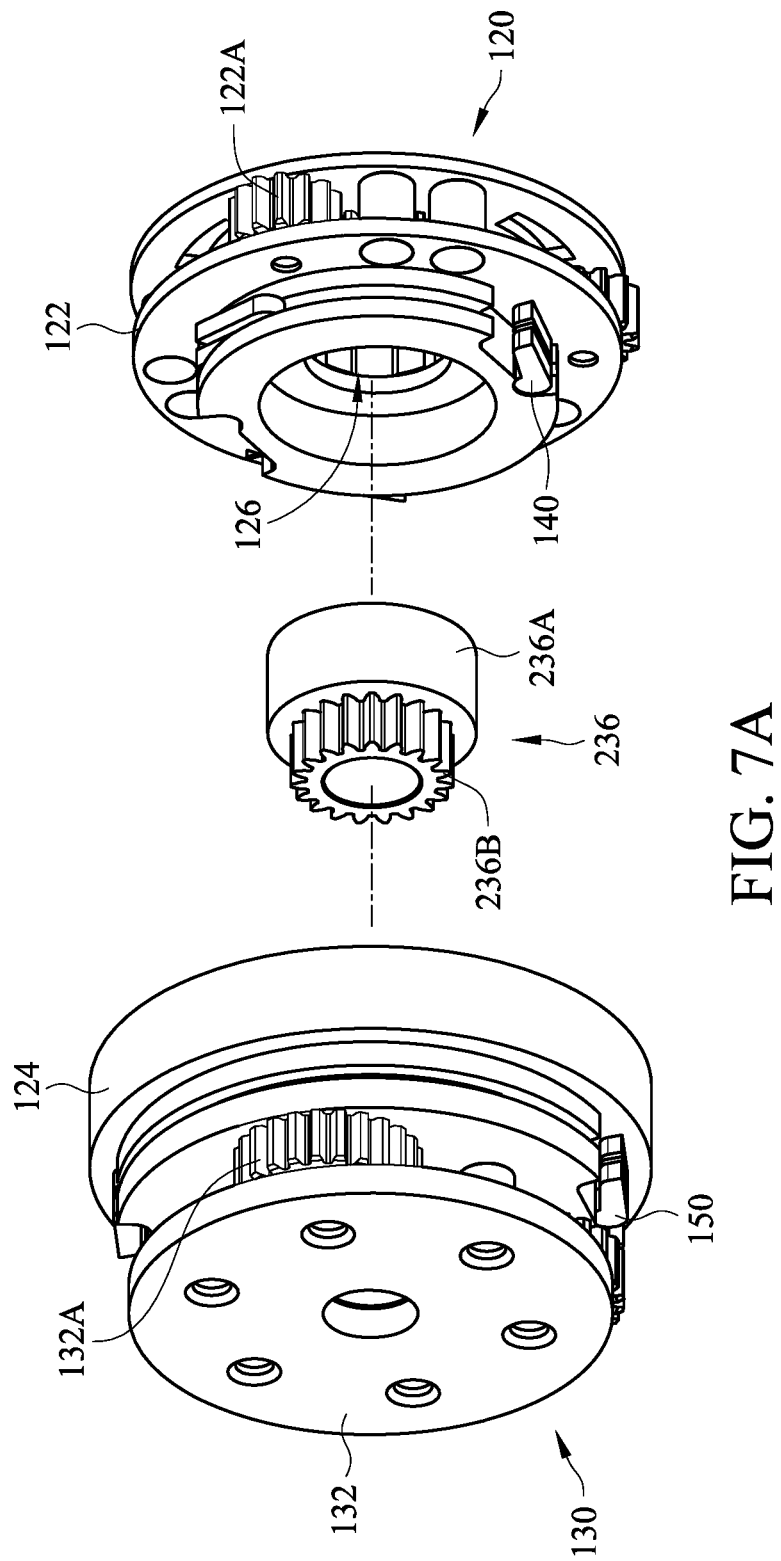
FIG. 7A is a schematic partial exploded view of a plurality of planetary gear modules in accordance with this disclosure.

FIG. 6 is a schematic view of an embodiment of the bicycle gear hub in accordance with this disclosure. FIG. 7A is a schematic partial exploded view of a plurality of planetary gear modules in accordance with this disclosure. FIG. 6 demonstrates schematically an aspect of applying the planetary gear module of FIG. 1 to a bicycle gear hub. Referring to FIG. 1, FIG. 6 and FIG. 7A, the bicycle gear hub 100 of this embodiment includes an axle 110, at least two planetary gear modules (a first planetary gear module 120 and a second planetary gear module 130 in this embodiment), at least two one-way clutches (a first one-way clutch 140 and a second one-way clutch 150 in this embodiment), a transmission part 160, a hub shell 180 and a shifting guide wheel 190. In this embodiment, the connecting relationship and operation of the axle 110, the first planetary gear module 120, the second planetary gear module 130, the first one-way clutch 140, the second one-way clutch 150 and the transmission part 160 are the same as the foregoing description, and thus detail thereabout would be omitted herein.

In this embodiment, the shifting guide wheel 190 is used to connect a cable (not shown in the figure) of a gearshift handle (not shown in the figure). The transmission part 160 is disposed between the shifting guide wheel 190 and the first planetary gear module 120.

In this embodiment, the axle 110, the transmission part 160, the planetary gear modules including the first planetary gear module 120 and the second planetary gear module 130, and the shift mechanism 170 including the shift actuator 172 are all disposed inside the hub shell 180.

In this embodiment, referring to FIG. 1 and FIG. 6, the first planetary gear module 120 is disposed between the transmission part 160 and the second planetary gear module 130. In other words, in comparison to the first planetary gear module 120, the second planetary gear module 130 is farer from the transmission part 160; i.e., the most furthest planetary gear module to the transmission part 160. Since the second planet carrier 132 of the second planetary gear module 130 is already furnished with a one-way clutch 150, thus no more one-way clutch between the second ring gear 134 and the hub shell 180 is required. Hence, the design of fixedly connecting the ring gear 134 of the most furthest planetary gear module (i.e., the second planetary gear module 130 in this embodiment) with respect to the transmission part 160 to the hub shell 180 can substantially reduce the number of required elements.

In this embodiment, the first planetary gear module 120 and the second planetary gear module 130 can be connected in series. As shown in FIG. 1 and FIG. 6, between the planetary gear module the closest to the transmission part 160 (i.e., the first planetary gear module 120 in this embodiment) and another planetary gear module the furthest to the transmission part 160 (i.e., the second planetary gear module 130 in this embodiment), the ring gear of the planetary gear module would be performed as the planet carrier of the next planetary gear module. As shown in FIG. 7A, the first ring gear 124 of the first planetary gear module 120 is formed as a portion of the second planet carrier 132 of the second planetary gear module 130, and thus an advantage of connection in series can be obtained.

Figure 7B:
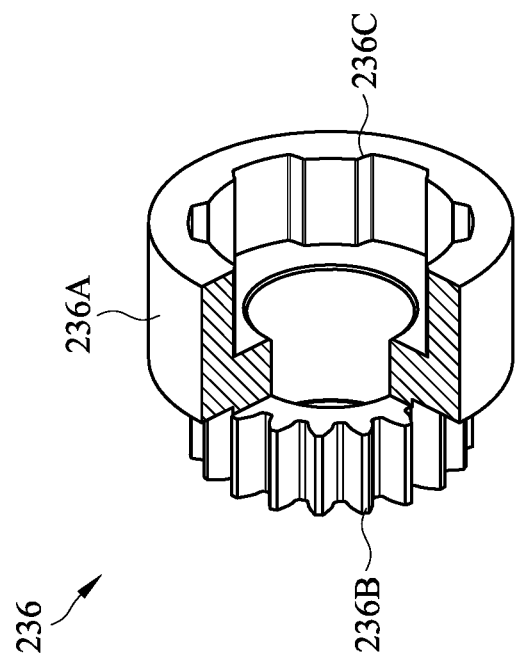
FIG. 7B is a schematic view of an embodiment of the sun gear in accordance with this disclosure.

In one embodiment, the type of the first sun gear 126 of the first planetary gear module 120 is the same as that of the sun gear connected in series (i.e., the second sun gear 136 of the second planetary gear module 130 in FIG. 1); but, definitely, this disclosure is not limited thereto. As shown in FIG. 7A and FIG. 7B, the second sun gear 236 includes a sun-gear body 236A, external gear teeth 236B and internal ratchet teeth 236C. The sun-gear body 236A is furnished thereinside with the internal ratchet teeth 236C. The external gear teeth 236B are formed at a side of the sun-gear body 236A. In this second sun gear 236, the external gear teeth 236B and the internal ratchet teeth 236C are arranged in an offset manner. That is, the external gear teeth 236B and the internal ratchet teeth 236C are not radially aligned, such that the size of the sun gear can be reduced, and also the strength thereof can be ensured. In this embodiment, the second sun gear 236 is the furthest sun gear with respect to the transmission part 160.

Figure 8:
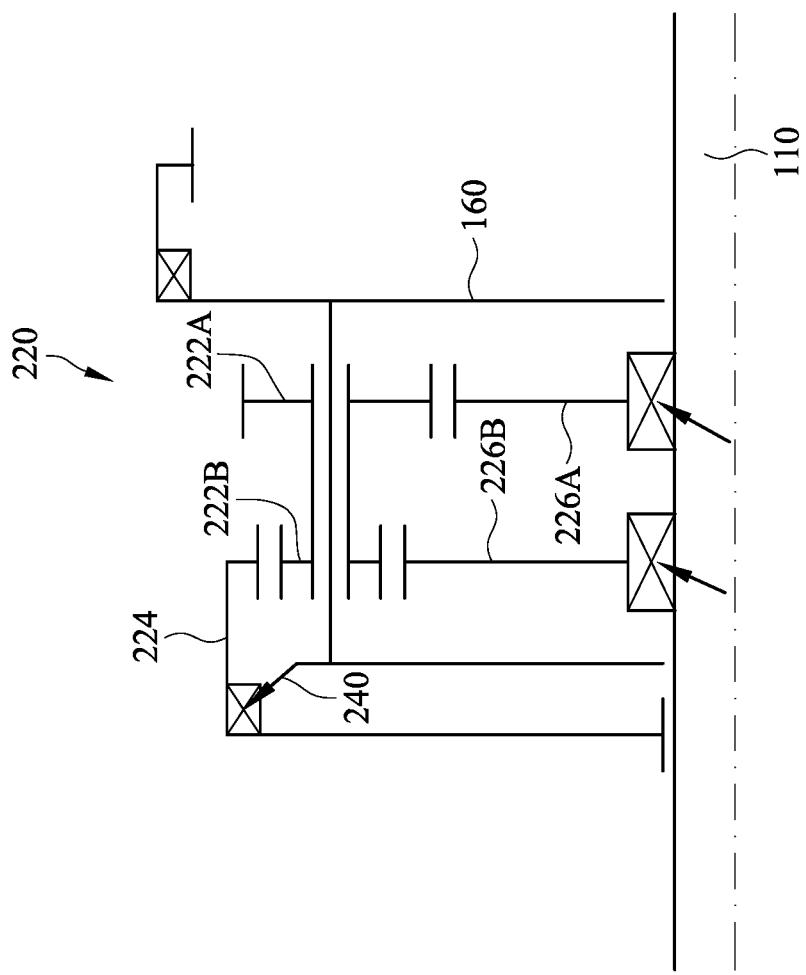
FIG. 8 is a schematic view of another embodiment of the planetary gear module in accordance with this disclosure.

Referring to FIG. 1 and FIG. 6, both the first planetary gear module 120 and the second planetary gear module 130 are the simplest type of the planetary gear modules; i.e., each thereof including a planet carrier, a ring gear, a planet gear and a sun gear, but not limited thereto. In one embodiment, as shown in FIG. 8, the first planetary gear module 220 is a compound planetary gear train, and includes a ring gear 224, a planet carrier including at least two levels of compound planet gears (a first planet gear 222A and a second planet gear 222B in this embodiment), and a plurality of sun gears (a first sun gear 226A and a second sun gear 226B in this embodiment, corresponding to the first planet gear 222A and the second planet gear 222B, respectively). The one-way clutch 240 is connected with the second planet gear 222B of the planet carrier and the ring gear 224. Upon such an arrangement, engagement of the first sun gear 226A or the second sun gear 226B to the axle 110 would provide two gearshift choices.

Figure 9C:
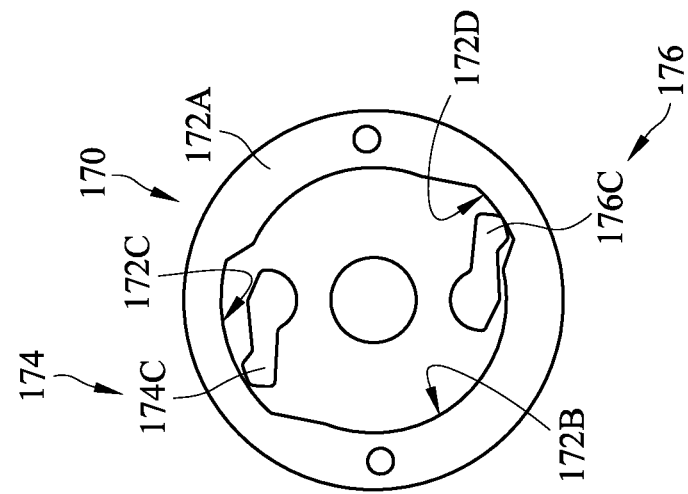
FIG. 9C demonstrates schematically a high gear of a third gear of the shift mechanism in accordance with this disclosure.
Figure 9B:
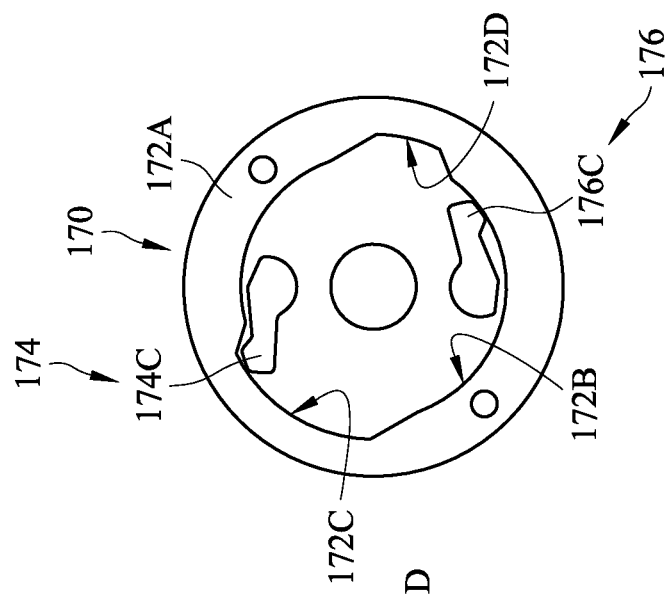
FIG. 9B demonstrates schematically a second gear of the shift mechanism in accordance with this disclosure.
Figure 9A:
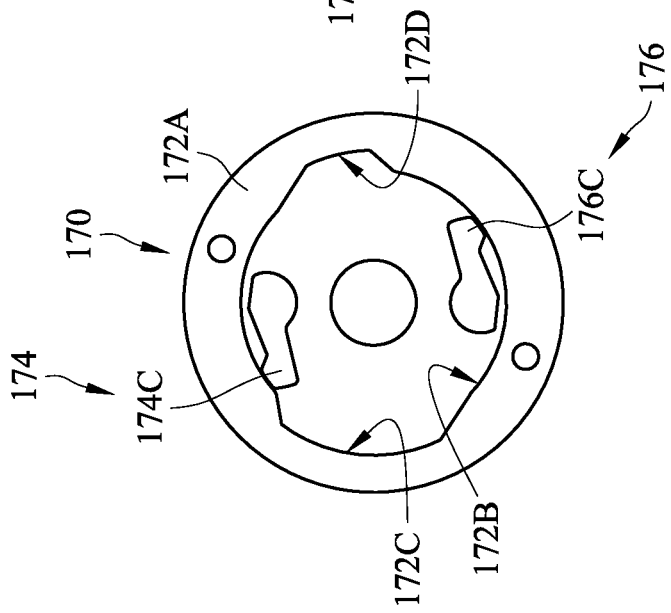
FIG. 9A demonstrates schematically a low gear of a first gear of the shift mechanism in accordance with this disclosure.

Refer to FIG. 1 to FIG. 6, and FIG. 9A to FIG. 9C, where FIG. 9A demonstrates schematically a low gear of a first gear of the shift mechanism in accordance with this disclosure, FIG. 9B demonstrates schematically a second gear of the shift mechanism in accordance with this disclosure, and FIG. 9C demonstrates schematically a high gear of a third gear of the shift mechanism in accordance with this disclosure. While in gear-shifting, a cable can be utilized to control the rotation of the shift actuator 172. Based on the number of the plurality of planetary gear modules (the first planetary gear module 120 and the second planetary gear module 130 in this embodiment), the rotation of the shift actuator 172 would provide a plurality of speed-up ratios for shifting between the low gear and the high gear. In particular, in each shifting (for example, from the first gear to the second gear, from the second gear to the third gear, from the third gear to the second gear, or from the second gear to the first gear), only one control protrusion of the control pawl is controlled to be opened or closed.

For example, as shown in FIG. 9A, both the first control protrusion 174C and the second control protrusion 176C are not positioned inside the corresponding recess portions of the hollow ring body 172A (the first recess portion 172C and the second recess portion 172D, respectively), but on the inner surface 172B of the hollow ring body 172A, such that both the first control pawl 174 and the second control pawl 176 are in the closed state. At the same time, the first sun-gear engaging protrusion 174D of the first control pawl 174 and the second sun-gear engaging protrusion 176D of the second control pawl 176 are both not positioned in the corresponding recess portions inside the first sun gear 126 and the second sun gear 136, respectively, such that both the first sun gear 126 and the second sun gear 136 are not fixed to the axle 110. At this time, both the first planetary gear module 120 and the second planetary gear module 130 are in the 1:1 input/output mode; i.e., the low gear of the first gear.

Then, the shift actuator 172 is rotated. At this time, as shown in FIG. 9B, the first control protrusion 174C is not located in the first recess portion 172C of the hollow ring body 172A, and the second control protrusion 176C is located in any of the recess portions of the hollow ring body 172A (such as the first recess portion 172C or the second recess portion 172D). In this example, the second control protrusion 176C is located on the inner surface 172B of the hollow ring body 172A. Thereupon, the first control pawl 174 is in the opened state, while the second control pawl 176 is in the closed state. In addition, simultaneously, the first sun-gear engaging protrusion 174D of the first control pawl 174 is located in the recess portion inside the first sun gear 126, but the second sun-gear engaging protrusion 176D of the second control pawl 176 is still out of the recess portion inside the second sun gear 136, such that the first sun gear 126 can be fixed to the axle 110, while the second sun gear 136 is not. Thereupon, the first planetary gear module 120 would be in the speed-up input/output mode, but the second planetary gear module 130 is not. Thus, the second gear is achieved. As described, in the operation of shifting the first gear to the second gear according to this disclosure, the recess portions are applied to control opening and closing of the control protrusion of one of the control pawls.

Then, the shift actuator 172 is rotated further. As shown in FIG. 9C, the first control protrusion 174C is still in the first recess portion 172C of the hollow ring body 172A, and the second control protrusion 176C is located in the second recess portion 172D of the hollow ring body 172A, such that the first control pawl 174 and the second control pawl 176 are both in the opened state. Simultaneously, the first sun-gear engaging protrusion 174D of the first control pawl 174 and the second sun-gear engaging protrusion 176D of the second control pawl 176 would be located in the recess portions of the first sun gear 126 and the second sun gear 136, respectively, so as to have both the first sun gear 126 and the second sun gear 136 to be fixed to the axle 110. Namely, both the first planetary gear module 120 and the second planetary gear module 130 are in the speed-up input/output mode. After adding up the speed-up ratios of the first planetary gear module 120 and the second planetary gear module 130, the high gear of the third gear is achieved. As described, in the operation of shifting the second gear to the third gear according to this disclosure, the recess portions are also applied to control opening and closing of the control protrusion of one of the control pawls.

In the gearshift from the low gear of FIG. 9A to the high gear of FIG. 9C, the shift actuator 172 is rotated clockwise to perform the shifting. On the other hand, if the gearshift is executed from the high gear of FIG. 9C down to the low gear of FIG. 9A, then the shift actuator 172 should be rotated counter clockwise to perform the shifting. In addition, by following an order from the furthest planetary gear module to the transmission part 160 (such as the second planetary gear module 130 in FIG. 1 or FIG. 6) to the closest planetary gear module to the transmission part 160 (such as the first planetary gear module 120 in FIG. 1 or FIG. 6), the second control pawl 176 and the first control pawl 174 are closed sequentially. In addition, in the gearshift from the high gear of FIG. 9C to the low gear of FIG. 9A, the rotational direction of the shift actuator 170 is identical to the close direction of the corresponding control pawl.

In detail, in the operation from FIG. 9C to FIG. 9B, the shift actuator 172 is rotated in the close direction (i.e., counter clockwise) to have the second control protrusion 176C not in the recess portions of the hollow ring body 172A (such as the first recess portion 172C and the second recess portion 172D), but the first control protrusion 174C still in the first recess portion 172C of the hollow ring body 172A, such that the first control pawl 174 can be in the opened state, while the second control pawl 176 is in the closed state. It can be found that the close direction of the second control protrusion 176C of the second control pawl 176 is counter clockwise, the same as the counter-clockwise rotational direction of the shift actuator 170. Thus, an advantage of labor saving can be obtained.

Then, in the operation from FIG. 9B to FIG. 9A, the shift actuator 172 is rotated further by an angle in the counter-clockwise close direction, so the second control protrusion 176C would be still not in the recess portions of the hollow ring body 172A (such as the first recess portion 172C and the second recess portion 172D), but the first control protrusion 174C of the first control pawl 174 would be rotated counter clockwise to leave the first recess portion 172C of the hollow ring body 172A and position on the inner surface 172B of the hollow ring body 172A, such that the first control pawl 174 and the second control pawl 176 can be both in the closed state. Similarly, it can be found that the close direction of the first control protrusion 174C of the first control pawl 174 is counter clockwise, the same as the counter-clockwise rotational direction of the shift actuator 170. Thus, an advantage of labor saving can be obtained.

In evaluating the speed ratios of the planetary gear modules, the furthest planetary gear module to the transmission part 160 would have the fastest speed. In considering the conservation of power, the power is equal to the product of the rotation speed and the torque. Thus, the furthest planetary gear module to the transmission part 160 would have the smallest torque. Upon such an arrangement, while the gearshift is from the high gear to the low gear, the fastest planetary gear module would be closed firstly, and thus resistance against the gearshift would be the least, so that the labor can be substantially saved.

Figure 10:
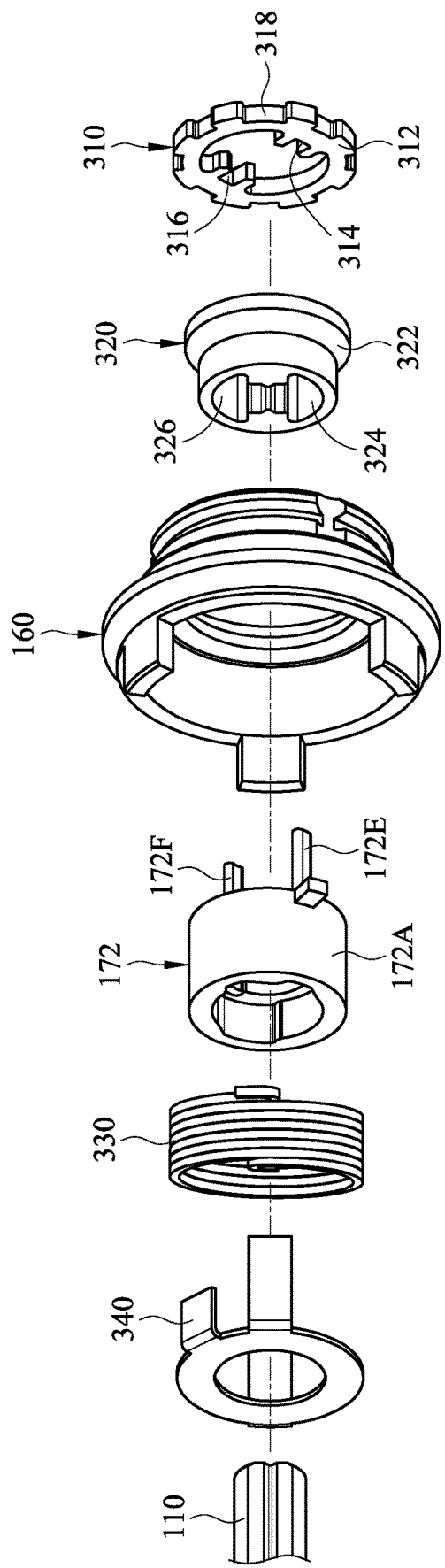
FIG. 10 is a schematic exploded view of a portion of the bicycle gear hub in accordance with this disclosure.

Refer to FIG. 6 and FIG. 10, where FIG. 10 is a schematic exploded view of a portion of the bicycle gear hub in accordance with this disclosure. In this embodiment, the bicycle gear hub 100 further includes an internal guide wheel 310, a right-side collar ring 320, a return spring 330 and a spring seat 340. The internal guide wheel 310 includes an internal-guide-wheel ring body 312, at least two recess portions (including a first recess portion 314 and a second recess portion 316 in this embodiment), and a plurality of keyways 318, in which the internal-guide-wheel ring body 312 itself is a hollow ring body. The first recess portion 314 and the second recess portion 316 are individually disposed at different positions inside the internal-guide-wheel ring body 312 in a manner of protruding from an inner surface of the internal-guide-wheel ring body 312. The plurality of keyways 318 are formed individually at different positions on an outer surface of the internal-guide-wheel ring body 312. The right-side collar ring 320 includes a collar-ring body 322 and a plurality of through holes (a first through hole 324 and a second through hole 326 in this embodiment). The first through hole 324 and the second through hole 326 are individually disposed at an end surface of the collar-ring body 322. The shift actuator 172 includes a hollow ring body 172A and two protruding pillars 172E, 172F, in which the two protruding pillars 172E, 172F are individually protruded from a side of the hollow ring body 172A. The shift actuator 172 penetrates through the transmission part 160 by having the two protruding pillars 172E, 172F to plug into the first through hole 324 and the second through hole 326 of the collar-ring body 322, respectively, such that the two protruding pillars 172E, 172F can be engaged fixedly with the first recess portion 314 and the second recess portion 316 of the internal guide wheel 310, respectively. Thereupon, the internal guide wheel 310 can be rotated with the shift actuator 172, and both the first through hole 324 and the second through hole 326 of the collar-ring body 322 are provided with enough space for the two corresponding protruding pillars 172E, 172F of the shift actuator 172 to be rotational thereinside. The spring seat 340 is fixed to the axle 110. The return spring 330 is connected between the shift actuator 172 and the spring seat 340, for providing elastic forcing for rotations. In this embodiment, the return spring 330 can be a torsion spring.

Figure 11:
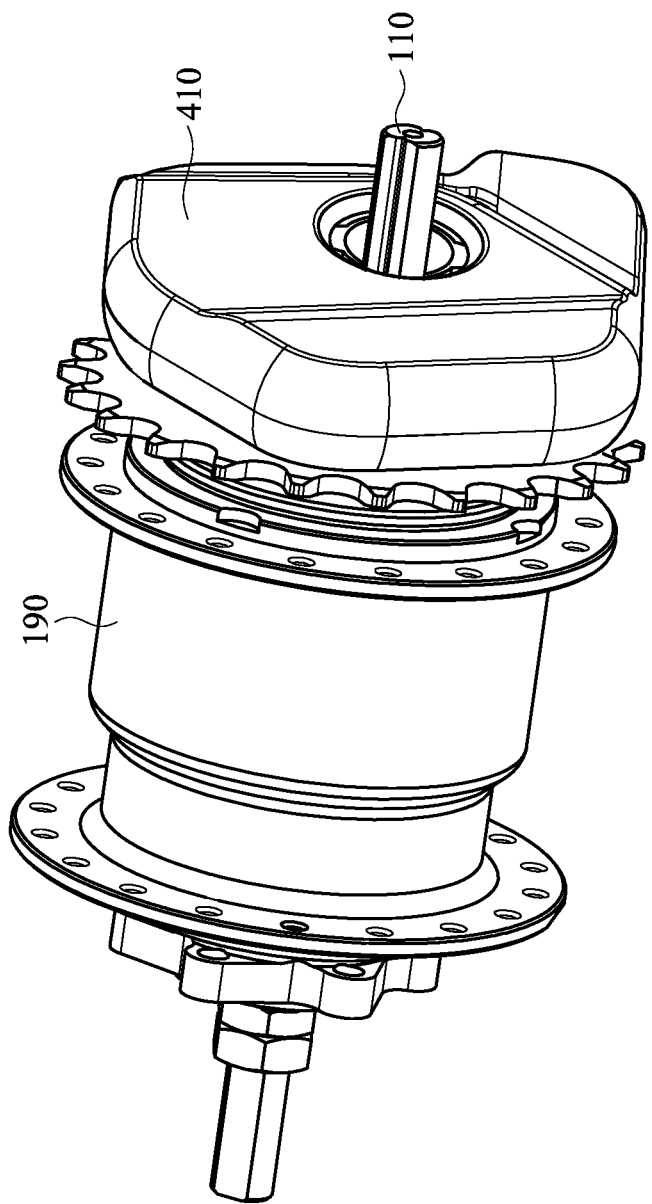
FIG. 11 is a schematic perspective view of an embodiment of the electronic shifting unit in accordance with this disclosure.
Figure 12:
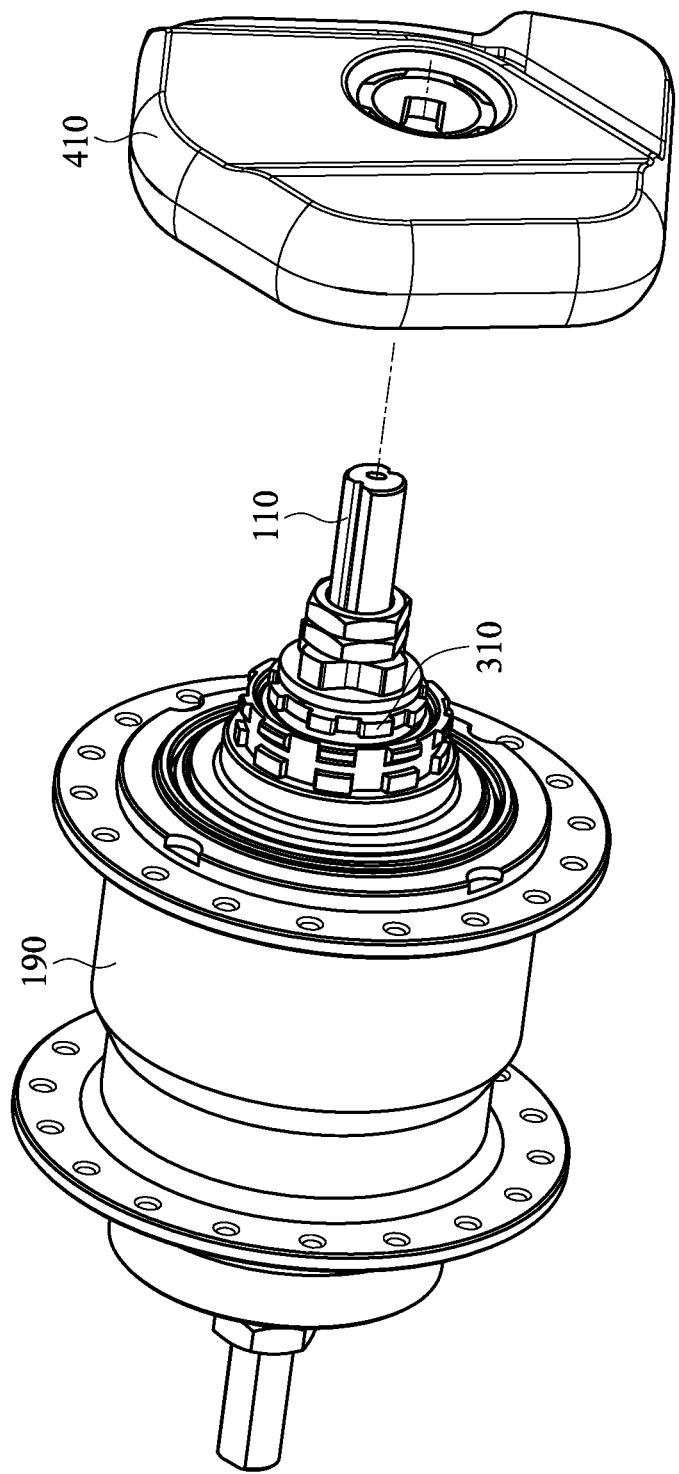
FIG. 12 is a schematic exploded view of FIG. 11.
Figure 13:
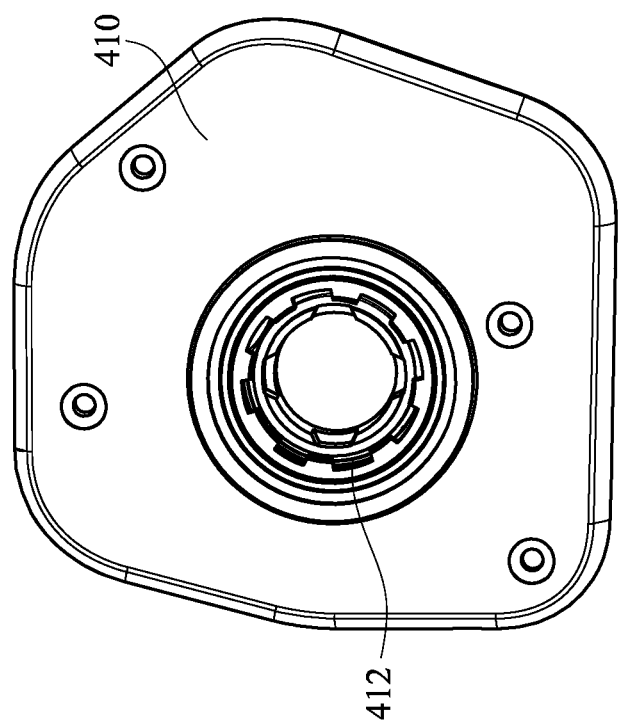
FIG. 13 is a schematic side view of FIG. 11.

In the aforesaid descriptions, a mechanical means is applied for driving, but this disclosure is not limited thereto. As shown in FIG. 11 to FIG. 13, an electronic shifting means is introduced. This embodiment includes an electronic shifting unit 410 and an internal guide wheel 310, in which the internal guide wheel 310 can be referred to the internal guide wheel 310 of FIG. 10. The external keyway 318 of the internal guide wheel 310 is fitted with a corresponding keyway 412 of the electronic shifting unit 410. The electronic shifting unit 410 can include a motor, a circuit board and a reduced gear system. The motor is connected with the circuit board and the reduced gear system. The motor is used to drive the reduced gear system, further to rotate the internal guide wheel 310, and more further to rotate together the shift actuator 172.

To sum up, when the high gear is shifted to the low gear in this disclosure, the fastest planetary gear module is firstly closed, such that the resistance against gearshift can be reduced, and also the labor can be saved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A bicycle gear hub, comprising:
    an axle;
    at least two planetary gear modules, sequentially disposed at the axle, the at least two planetary gear modules being connected in series, each of the at least two planetary gear modules including a planet carrier, a ring gear and a sun gear, the planet carrier being furnished thereinside with the sun gear, the ring gear being meshed with a planet gear in the planet carrier;

at least two one-way clutches, connected correspondingly the planet carrier and the ring gear;

a shift mechanism, including a shift actuator and at least two control pawls, the shift actuator being disposed at the axle, the at least two control pawls being movably disposed at different positions of the axle, each of the at least two control pawls including a control protrusion, the shift actuator including thereinside a plurality of recess portions corresponding to the control protrusions, the shift actuator rotating to provide a plurality of speed-up ratios according to a number of the at least two planetary gear modules, gearshift between a low gear and a high gear being performed according to the plurality of speed-up ratios, the plurality of recess portions being used to control opening and closing of the control protrusion of one of the at least two control pawls so as to control the sun gear corresponding to one of the at least two planetary gear modules to be fixed to the axle while in each the gearshift; wherein, when the high gear is shifted to the low gear, a rotational direction of the shift actuator is identical to a close direction of the corresponding one of the at least two control pawls; and a transmission part, the shift actuator being connected between the transmission part and the at least two planetary gear modules; wherein, when the high gear is shifted to the low gear, sequentially from one of the at least two planetary gear modules the furthest to the transmission part to another one of the at least two planetary gear modules the closest to the transmission part, the plurality of recess portions are utilized to close the at least two control pawls corresponding to the at least two planetary gear modules so as to have the sun gear of the corresponding one of the at least two planetary gear modules not to be fixed to the axle; wherein, while in shifting to a next gear, only the control protrusion of one of the at least two control pawls is controlled to perform the opening and closing.

2. The bicycle gear hub of claim 1, further including a shifting guide wheel, the transmission part being disposed between the shifting guide wheel and the at least two planetary gear modules.

3. The bicycle gear hub of claim 1, further including an electronic shifting unit and an internal guide wheel, an outer keyway of the internal guide wheel being fitted with an inner keyway of the electronic shifting unit.

4. The bicycle gear hub of claim 3, further including a return spring and a spring seat, the spring seat being fixed to the axle, the return spring being connected with the shift actuator and the spring seat.

5. The bicycle gear hub of claim 1, wherein, between one of the at least two planetary gear modules the closest to the transmission part and another one of the at least two planetary gear modules the furthest to the transmission part, the ring gear of each of the at least two planetary gear modules is formed as the planet carrier of the next planetary gear module.

6. The bicycle gear hub of claim 1, further including a hub shell, wherein the axle, the transmission part, the at least two planetary gear modules and the shift mechanism are disposed in the hub shell, and the ring gear of one of the at least two planetary gear modules the furthest to the transmission part is fixed to the hub shell.

7. The bicycle gear hub of claim 1, wherein one of the at least two planetary gear modules is a compound planetary gear train, the compound planetary gear train includes the planet carrier, the ring gear, at least two levels of compound planet gears and the sun gear corresponding to the plurality of compound planet gears.

8. The bicycle gear hub of claim 1, wherein, in an axial direction of the axle, the at least two control pawls have different lengths, and the length of one of the at least two control pawls is a distance from the control protrusion thereof corresponding to the shift actuator to the sun gear of the one of the at least two planetary gear modules corresponding to the control pawl.

9. The bicycle gear hub of claim 1, wherein the sun gear includes a sun-gear body, external gear teeth and internal ratchet teeth, the internal ratchet teeth are disposed inside the sun-gear body, and the external gear teeth are formed at a side of the sun-gear body.

10. The bicycle gear hub of claim 1, wherein external gear teeth and internal ratchet teeth of the sun gear the furthest to the transmission part are arranged in an offset manner.

11. The bicycle gear hub of claim 1, wherein the plurality of speed-up ratios exceed the N-th power of 1.33, and the N is the number of the at least two planetary gear modules.

* * * * *